US006850776B1

United States Patent
Sandelius et al.

(10) Patent No.: US 6,850,776 B1
(45) Date of Patent: Feb. 1, 2005

(54) ELECTRIC APPARATUS HAVING VISUAL INDICATOR MEANS

(75) Inventors: Thomas Sandelius, Malmö (SE); Martin Ek, Dalby (SE); Anton Åberg, Malmö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 448 days.

(21) Appl. No.: 09/608,511

(22) Filed: Jun. 30, 2000

(51) Int. Cl.⁷ .............................. H04B 1/38; H04M 1/00
(52) U.S. Cl. ...................................................... 455/557
(58) Field of Search ........................... 455/557; 345/352

(56) References Cited

U.S. PATENT DOCUMENTS

| 4,975,694 A | * | 12/1990 | McLaughlin et al. |
| 5,446,783 A | | 8/1995 | May |
| 5,880,732 A | * | 3/1999 | Tryding ...................... 345/352 |

FOREIGN PATENT DOCUMENTS

| WO | 98/56152 | | 12/1998 |
| WO | WO 00/17840 | * | 3/2000 |
| WO | WO 01/05124 | * | 1/2001 |
| WO | WO 01/05125 | * | 1/2001 |

* cited by examiner

*Primary Examiner*—William Cumming

(57) ABSTRACT

An electric device includes a housing having an indicator window and a visual indicator adapted to emit a visible light signal through the indicator window for indicating a status of the device. The device also has at least one of the following components, which are operative within a first spectral range of light substantially covering red or infrared light: an IR transmitter for transmitting infrared light, an IR receiver for receiving infrared light, an electronic component sensitive to infrared light, or an optical detector susceptible of infrared or red light. The visible light signal is provided within a second spectral range, which substantially covers blue light and is outside the first spectral range.

16 Claims, 3 Drawing Sheets

ELECTRIC APPARATUS HAVING VISUAL INDICATOR MEANS

TECHNICAL FIELD

The present invention relates to an electric apparatus having a housing, an indicator window in the housing, and visual indicator means adapted to emit a visible light signal through the indicator window for indicating a status of the apparatus, wherein the apparatus furthermore has at least one of the following components, which are operative within a first range of light essentially covering red or infrared light: an IR transmitter for transmitting infrared light, an IR receiver for receiving infrared light, an electronic component sensitive to infrared light, or an optical detector susceptible of infrared or red light,

BACKGROUND ART

A mobile or cellular telephone is a well-known example of an apparatus according to the above. Within the context of this document reference will consistently be made to a mobile telephone for any commercially available mobile communications network, such as GSM. However, the invention is not limited to merely a mobile telephone; other equally applicable examples of electric apparatuses are radio pagers lap-top computers, organizers and communicators (also known as personal digital assistants), i.e. portable telephone devices including a computer and application programs, such as a built-in calendar, Moreover, the term "mobile communications network" is meant to have the widest possible meaning, thereby including all types of cellular networks, satellite networks, wireless local area networks (LANs), etc.

Mobile telephones are generally provided with a visual indicator for indicating status information about the connectivity of the mobile telephone with respect to the mobile communications network. Moreover, a battery charge indicator in often provided for alerting a user of the telephone, when the remaining battery charge drops below a predetermined limit. W098/56152 discloses a mobile telephone having such status indicators.

One common approach is to provide the mobile telephone with a combined green and red indicator window mounted at the top of the telephone housing. A dual-color light emitting device, such as a red light emitting diode (LED) combined with a green LED, is mounted to a printed circuit board within the telephone housing. An optical light guide is arranged between the external indicator window and the internal light emitting device. The dual-color light emitting device may for instance be used according to the following:

| | |
|---|---|
| Green light flashing at low frequency | The mobile telephone is in contact with at least one base transceiver station (BTS) |
| No green light | No contact with any BTS |
| Green light flashing at a higher frequency | A message is available (such as SMS) |
| Red flashing light | Low battery charge level |
| Red continuous light | The battery is being recharged |

Consequently, a green visual indicator is used for informing the user of whether the mobile telephone is in operative contact with the mobile communications network (so that, inter alia, the user is free to initiate an outgoing telephone call), or whether the mobile telephone has currently lost its operative contact with the mobile communications network.

Many mobile telephones and other portable communication apparatuses are provided with at least one component, which either operates with, or is sensitive to, infrared (IR) or visible red light. For instance, the mobile telephone may be equipped with an IR port for performing information interchange with external devices. Another example is an optical detector, which is adapted to detect when the surrounding light is weaker than a predetermined limit, and in response turn on e.g. the display or the keyboard illumination, so as to give the user a better opportunity of operating the telephone also in situations of darkness. Such an optical detector may alternatively be used as a proximity switch for detecting whether the user or an external object is located in proximity with the mobile telephone. Yet another example is various unprotected integrated circuits (ICs) or other semiconductor components, which have no protective coating and which may be damaged if exposed to infrared light.

SUMMARY

According to the invention, the following problem is identified, and a solution thereof is provided, as defined by the enclosed independent patent claims.

Whenever a mobile telephone or other electric apparatus comprises at least one component, which according to the above operates with or is sensitive to infrared or visible red light, there is also a risk that the light produced by the visual indicator(s) will contain infrared or visible red wavelengths, particularly if the visual indicator is adapted to generate for instance a red visual indicator signal. In such a case, the infrared or visible red wavelengths may accidentally leak or propagate to the above components and consequently affect the operative realibility thereof in an undesired and uncontrollable way.

The above problem is solved through the inventive understanding that visual user feedback may be given by providing a visual indicator, that is adapted to produce a visible light signal in a spectral range, which is clearly separated (in terms of wavelengths) from visible red and infrared light. More specifically, the visible light signal is given a blue color.

Other objects, features and advantages of the present invention will appear from the following disclosure of the preferred embodiments, from the attached drawings as well as from the dependent claims.

BRIEF DESCRIPTION OF THE DRAWINGS

The present invention will now be described in more detail, reference being made to the accompanying drawings, in which.

DETAILED DESCRIPTION

Figure 1:
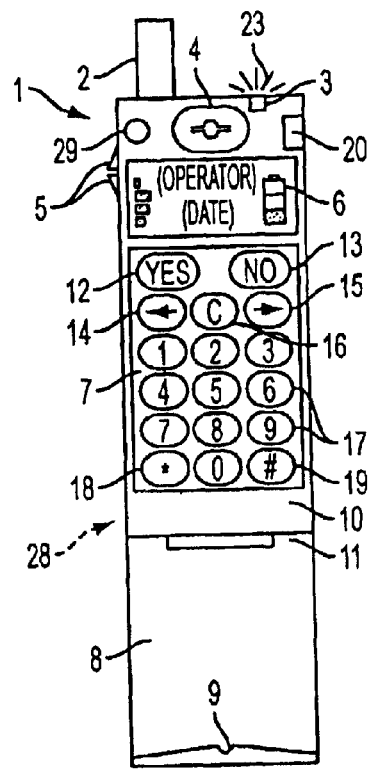
FIG. 1 is a schematic front view of an electric apparatus according to the invention, exemplified as a mobile telephone.

In all the drawings, similar or identical reference numerals have a similar or identical meaning and are therefore only described in detail with reference to the first drawing, in which they appear.

Figure 2:
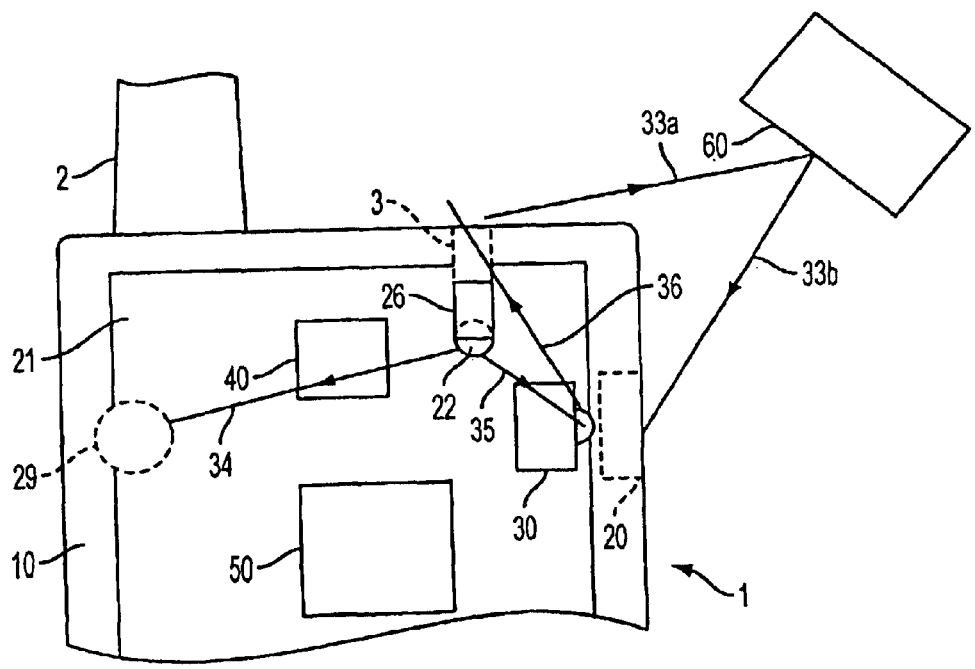
FIG. 2 is a schematic, enlarged plan view of a portion of the telephone shown in FIG. 1.
Figure 4:
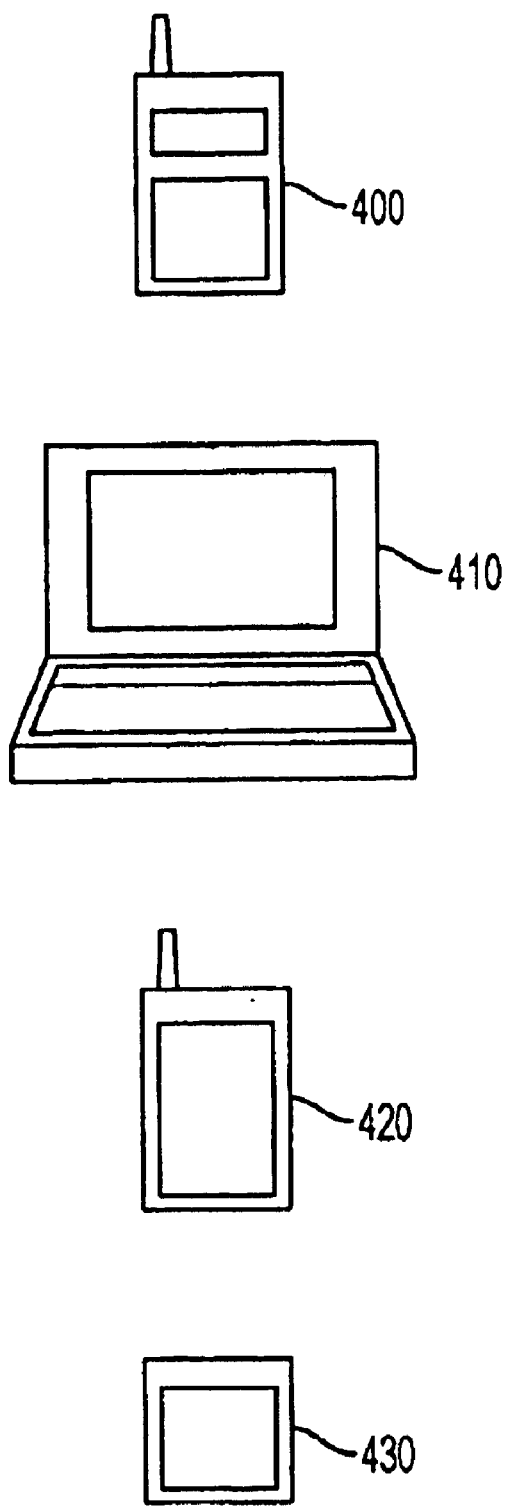
FIG. 4 shows some examples of an electric apparatus.

Some examples of an electric apparatus are shown in FIG. 4, which include a mobile telephone 400, a laptop computer 410, a personal digital assistant or organizer 420, and a radio pager 430. In FIG. 1 and FIG. 2, the features of the invention are described in connection with a mobile telephone 1; however, it will be understood to one of ordinary skill in this art that the features described therein are intended to be employed in any electric apparatus, such as those illustrated in FIG. 4. Referring to FIG. 1, the telephone has a housing 10, an antenna 2 mounted on top of the housing, a speaker 4, volume adjustment controls 5, an LCD display 6 and a keybpad 7. The keypad 7 has a plurality of individual keys, such a YES button 12 and a NO button 13, arrow keys 14, 15, a clear key 1G, numeric keys 17(labeled "0" through "9"), a star key 18 and a hash key 19. A status indicator window 3 is provided at the top portion of the housing 10 and is adapted to emit a visible status indication signal 23. An IR port 20 is provided at the upper right side portion of the telephone housing 10 and is adapted to perform wireless information interchange with accessories or other external devices over an IR link. An optical detector 29 is provided to the left of the upper front portion of the housing 10. The optical detector 29 is arranged to act as a proximity detector for determining the presence of an external object or user by detecting reflected IR light. Additionally or alternatively, the optical detector 29 may be used for providing automatic illumination of certain parts of the telephone, such as the display 6 and/or the keypad 7, in situations of poor light.

A rechargeable battery 28 is mounted at the rear of the telephone housing 10 and is therefore not visible in the front view of FIG. 1. Consequently, the battery 28 has only been indicated by way of a dashed arrow. A foldable flip 8 is movably mounted to the apparatus housing 10 by means of a hinge mechanism 11. The flip 8 comprises a sound opening 9, through which vocal sound is received from the user of the telephone and forwarded to an internal microphone (not shown in the drawing).

Figure 3:
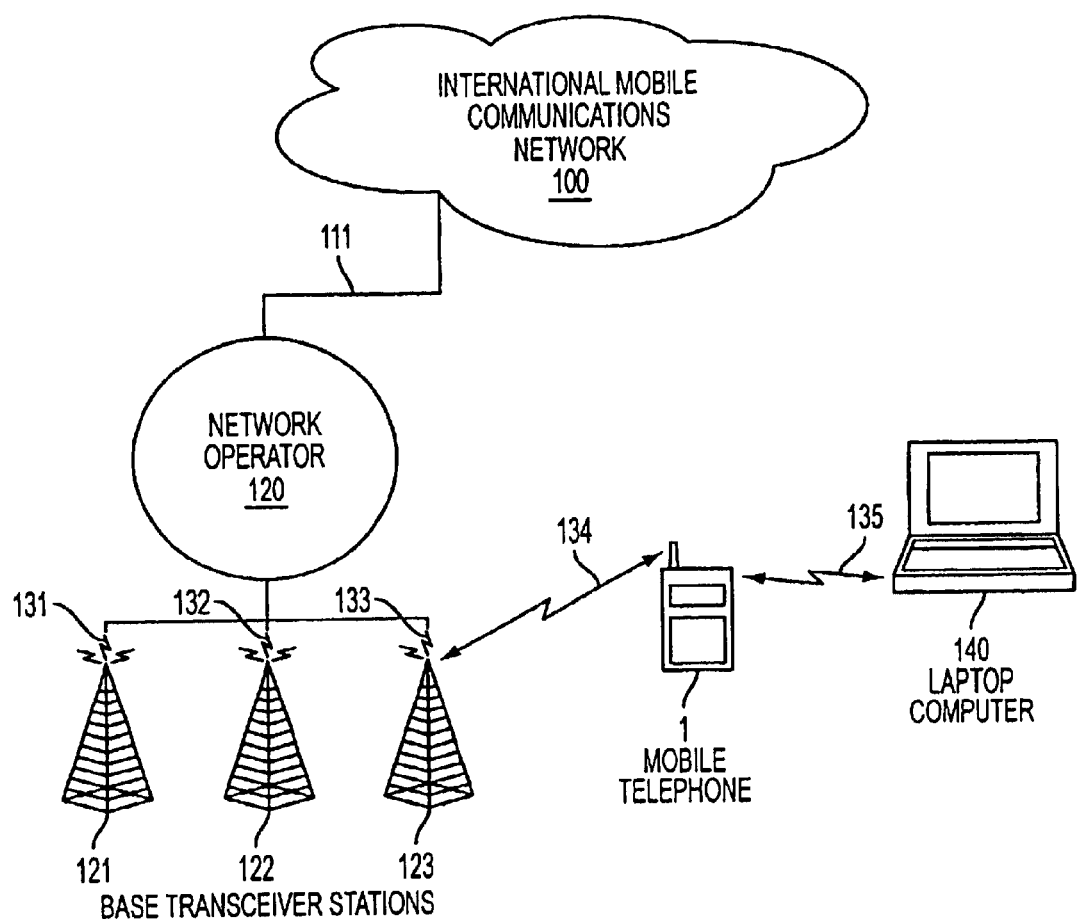
FIG. 3 is a schematic block diagram, illustrating a mobile telephone, a mobile communications network and an external device, with which the mobile telephone communicates over first and second wireless links.

Referring for a moment to FIG. 3, an exemplifying real-life use of the mobile telephone 1 is illustrated. The user of the mobile telephone 1 has a mobile communications subscription at a mobile communications network operator 120. The network operator 120 disposes of various mobile communications network equipment, including a plurality of base transceiver stations (BTS) 121, 122, 123, which are connected to the network operator 120 through respective links 131, 132, 133. The mobile telephone 1 accesses the mobile communications network 100 over a radio link 134 to the nearest base transceiver station 123. The mobile communications network provided by the network operator 120 is a conventional cellular mobile communications network, such as GSM, which in turn is part of an international mobile communications network 100, to which the network operator 120 is connected through a link 111. In GSM, the wireless link 134 operates on either 900 MHz or 1800 MHz.

Furthermore, the mobile telephone 1 may establish, through the IR port 20, a supplementary short-range IR link 135 for information interchange with telephone accessories or any other piece of external equipment, such as a laptop computer 140, which is provided with a corresponding IR port and is available in proximity with the mobile telephone 1, for instance within a distance of 0.5 m. In the preferred embodiment, the supplementary short-range IR link 135 is a standardized, serial infrared communications link according to IrDA (the Infrared Data Association), having its headquarters in Walnut Creek, Calif. USA.

Referring back to FIG. 2, a schematic plan view is shown of an upper internal portion of the telephone 1 according to the preferred embodiment. The status indicator window 3, the IR port 20 and the optical detector 29 are all schematically indicated by dashed symbols. The telephone 1 comprises a printed circuit board 21, upon which various circuits and components are provided, as will be described below.

One of these components is a transceiver device (not shown), which according to the preferred embodiment is a conventional dual-channel homodyne transmitter/receiver for use in a TDMA (Time Division Multiple Access) mobile communications network, such as the GSM network 100 of FIG. 3. As is readily realized by the skilled person, the transceiver device comprises various radio circuitry, such as bandpass filters, amplifiers, local oscillators, mixers, low-pass filters, AD converters, digital filters, etc. However, since the present invention is not directed at the radio parts of the apparatus, which are responsible for providing the communication link to the mobile communications network, the internal structure of the transceiver device is not described herein.

The printed circuit board 21 also contains a controller 50 (CPU, DSP, programmable logic array, etc), as well as associated memory circuits, etc (not shown). Moreover, the printed circuit board 21 has a light emitting device 22 mounted thereon at its uppermost end (facing the antenna 2). A light guide 26 is connected at a first end to the status indicator window 3 and at a second end to the light emitting device 22.

The light emitting device 22 of the preferred embodiment comprises a blue light emitting diode (LED), which is driven by logic circuitry not shown in FIG. 2. The light emitted from the blue diode 22 is guided through the light guide 26 to the status indicator window 3 for the purpose of providing status information to the user, as will be described below. In the preferred embodiment of FIG. 2, the light emitting device 22 is implemented by a blue-color LED, which is commercially available under the model name CL-270HE from Citizen, 1-23-1, Kami-kurechi, Fujiyoshidashi, Yamanashi-ken 403-0001, Japan. This LED has a peak wavelength at about 470 nm. However, other blue wavelengths are possible, such as 430 nm. Alternatively, the device 22 may be implemented by any other commercially available light emitting component.

The status indicator window 3 is made from a material, which is made transparent to blue light but is essentially opaque to light of longer wavelengths, such as green, rod and infrared light. The choice of material for the window 3 is left to the skilled person, which is believed to be able to select a suitable material, for instance a plastics material, from the wide range of commercially available materials with spectral filtering characteristics.

As shown in FIG. 2, the printed circuit board 21further comprises an IR transmitter/receiver 30, which is mounted next to the IR port 20 and is arranged to provide aforesaid supplementary short-range IR link 135 to external devices. Assuming for a moment that the light emitting diode 22 was not adapted to produce blue light but light of longer wavelengths, such as green or red light, then there would be an apparent risk of leakage or propagation of spurious light from the light emitting diode 22 to the IR transmitter/receiver 30, as indicated by an arrow 35 in FIG. 2. Moreover, the infrared light emitted from the IR transmitter/receiver 30 could have propagated undesiredly through the status indicator window 3 (see arrow 36), had the window not been given a function for preventing other light than blue from escaping therethrough, as described above.

Similarily, if green or red light was emitted by the light emitting device 22 through the window 3, as indicated by an arrow 33a, such light could have propagated, through reflections at an external object 60, back to the IR port 20, as indicated by an arrow 33b, thereby causing undesired interference with the IR transmitter/receiver 30. Moreover, such green or red light could leak from the light emitting device 22 to an unprotected integrated circuit 40 and cause damage thereof, as indicated by an arrow 34. Additionally, this light could continue to the optical detector 29 and cause undesired interference.

Remembering now that the light emitted from the light emitting device 22 and through the status indicator window 3 is indeed blue and is kept within a spectral range (involving wavelengths such as 430 nm or 470 nm), which is clearly separated from the spectral range of visible red ligth (starting at 750 nm) or infrared light (between about 750 nm and 1 mm), it is clear that the present invention will effectively prevent such undesired interference.

The blue light signal 23 emitted by the light emitting device 22 may be used in many different ways for providing useful status indication to the user of the mobile telephone 1. For instance, the controller 50, or any other logic device of the telephone 1, may give the blue light signal 23 a flashing intensity for indicating that the mobile telephone 1 is in operative contact either with the mobile communications network 100 (over the radio link 134) or the external device 140 (over the supplementary short-range IR link 135). Moreover, the blue light signal 23 may be given a more rapidly flashing intensity, so as to indicate the availability of a message directed to the user and kept at the network operator 120. Other frequencies of flashing intensity may be used for indicating e.g. a low remaining charge of the battery 28, or that the battery 28 is currently being recharged. Additionally, the blue light signal 23 may be given a continuous intensity to indicate, for instance, that information is currently being exchanged over the radio link 134 or, alternatively, the IR link 135.

The present invention has been described above with reference to a few embodiments. However, other embodiments than the ones explicitly described are equally possible within the scope of the invention, as defined by the appended independent patent claims. In particular, the invention is applicable to other electric devices than mobile telephones, such as lap-top computers, radio pagers, communicators (personal digital assistants) or organizers.

What is claimed is:

1. An electric apparatus comprising:
   a housing including an indicator window and an IR port;
   an IR receiver positioned within the housing and operative to receive an IR signal from outside the housing through the IR port; and
   a light emitting device positioned within the housing and operative to emit a visible light signal outside the housing through the indicator window to indicate a status of the apparatus,
   wherein the IR receiver is positioned within range of spurious light signals from the light emitting device and the light emitting device never emits red or infrared light to prevent said spurious light signals from interfering with the IR receiver.

2. The apparatus of claim 1, wherein the light emitting device is operative to emit a visible light signal having a wavelength of about 470 nm.

3. The apparatus of claim 1, wherein the light emitting device is operative to emit a visible light signal having a wavelength of about 430 nm.

4. The apparatus of claim 1, wherein the light emitting device is a light emitting diode (LED) adapted to only emit blue light.

5. The apparatus of claim 1, wherein the indicator window is opaque to light within the red or infrared light range but transparent to light outside that range.

6. The apparatus of claim 1, comprising a controller, which is arranged to generate the visible light signal in response to a determined status of a wireless communication link between the electric apparatus and an external device.

7. The apparatus of claim 6, wherein the wireless communication link is a radio link in a mobile communications network.

8. The apparatus of claim 6, wherein the wireless communication link is a short-range infrared link for information interchange with the external device.

9. The apparatus of claim 1, wherein the apparatus is a radio telephone.

10. The apparatus of claim 1, wherein the apparatus is one of a laptop computer, a radio pager, a personal digital assistant or an organizer.

11. The apparatus of claim 1, wherein the spurious light signals reach the IR receiver via reflections off objects outside the housing.

12. The apparatus of claim 1, wherein the spurious light signals reach the IR receiver via reflections off objects in the housing.

13. An electric apparatus comprising:
    a housing including an indicator window, visual Indicator means adapted to emit a visible light signal through the indicator window for indicating a status of the apparatus, and
    an electronic component sensitive to light within a first spectral range substantially covering red or infrared light,
    wherein the electronic component is positioned within range of spurious light signals from the visual indicator means and the visual indicator means never emits red or infrared light to prevent said spurious light signals from interfering with the electronic component.

14. The electric apparatus of claim 13, wherein the electronic component at least Is one of an IR transmitter for transmitting infrared light, an IR receiver for receiving infrared light, and an optical detector susceptible to infrared or red light.

15. An electric apparatus comprising
    a housing including an indicator window, visual indicator means adapted to emit a visible light signal through the indicator window for indicating a status of the apparatus, and
    an electronic component sensitive to light within a first spectral range substantially covering red or infrared light, the electronic component being arranged to receive a portion of the visible light signal,
    wherein the visible light signal is limited to light within a second spectral range which substantially covers blue light and Is outside the first spectral range.

16. The electric apparatus of claim 15, wherein the electronic component at least is one of: an IR transmitter for transmitting Infrared light, an IR receiver for receiving infrared light, and an optical detector susceptible to infrared or red light.

* * * * *

UNITED STATES PATENT AND TRADEMARK OFFICE
CERTIFICATE OF CORRECTION

PATENT NO. : 6,850,776 B1
DATED : February 1, 2005
INVENTOR(S) : Thomas Sandelius, Martin EK and Anton Åberg It is certified that error appears in the above-identified patent and that said Letters Patent is hereby corrected as shown below:

Title page,
Insert Item -- [30] Foreign Application Priority Data
July 8, 1999 (SE) ..................... 9902623-9 --.

Column 1,
Line 16, change "light," to -- light. --.
Line 21, change "document" to -- document, --.
Line 29, change "calendar," to -- calendar. --.
Line 38, change "in" to -- is --.

Column 3,
Line 12, change "keybpad" to -- keypad --.

Column 4,
Line 36, change "CL-270HE" to -- CL-270HB --.
Line 45, change "rod" to -- red --.

Column 6,
Line 31, change "Indicator" to -- indicator --.
Line 59, change "Is" to -- is --.
Line 62, change "Infrared" to -- infrared --.

Signed and Sealed this

Thirteenth Day of September, 2005

JON W. DUDAS
*Director of the United States Patent and Trademark Office*